(12) United States Patent
Sucic et al.

(10) Patent No.: US 6,197,146 B1
(45) Date of Patent: Mar. 6, 2001

(54) METHOD AND APPARATUS FOR FORMING AIRFOIL STRUCTURES

(75) Inventors: Steve Sucic; Lori Ann M. Sucic, both of Southport, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 0 days.

(21) Appl. No.: 09/217,305

(22) Filed: Dec. 21, 1998

(51) Int. Cl.$^7$ .................................................. B29C 33/18
(52) U.S. Cl. ..................... 156/245; 156/285; 156/382; 156/500; 249/134; 264/257; 264/258; 264/511; 425/403; 425/500; 425/504
(58) Field of Search ..................... 156/245, 382, 156/285, 500; 264/258, 257, 511; 425/504, 403, 500; 249/134

(56) References Cited

U.S. PATENT DOCUMENTS 5,354,195 * 10/1994 Dublinski et al. ............... 156/382 X
5,484,277 * 1/1996 Lindsay ............................... 425/388

FOREIGN PATENT DOCUMENTS

1049198 * 11/1966 (GB).

* cited by examiner

Primary Examiner—Jeff H. Aftergut
(74) Attorney, Agent, or Firm—William W. Jones

(57) ABSTRACT

An assemblage for bonding the skin of an airfoil to the core of the airfoil includes a hybrid caul plate assembly for covering the surface of the airfoil assembly which is exposed to bonding pressure. The hybrid caul plate includes a central elastomeric component and peripheral semi-rigid metal components. The semi-rigid metal components are formed from a steel sinusoidal mesh and are axially elongated. The mesh is flexible in the direction of elongation, but are rigid in the transverse direction. The peripheral semi-rigid caul componnents will thus closely conform to the contours of the core in the axial direction, and will, at the same time, provide support for the edges of the core so that the core edges will not be crushed or deformed by bonding pressure applied to the assemblage during the skin-to-core bonding process. The result of using the hybrid caul plate assembly is an improved skin-to-core bond wherein bridging or voids in the bond line at the periphery of the airfoil are avoided.

11 Claims, 3 Drawing Sheets

METHOD AND APPARATUS FOR FORMING AIRFOIL STRUCTURES

TECHNICAL FIELD

This invention relates to a method and apparatus for forming an airfoil assembly such as a helicopter rotor blade. More particularly, this invention relates to a method and apparatus for bonding the airfoil assembly skin to the airfoil assembly core. This invention is particularly useful for bonding the airfoil skin to the airfoil core when the airfoil core, and thus the airfoil assembly, is provided with complex and pronounced surface contour changes.

BACKGROUND ART

Modern day airfoil assemblies such as helicopter rotor blades, flaps, ailerons, and the like, such as those shown in U.S. Pat. No. 5,320,494, include internal components which are structural support components, such as rotor blade spars; airfoil-shaping honeycomb components; and the like. These airfoil assemblies include an external skin which forms an envelope for the airfoil, and is typically made of a varying number of plies of fiberglass, or graphite impregnated with a resin matrix, generally epoxy, which is referred to in the industry as "prepreg". The internal airfoil components are preassembled and then are positioned in a bonding assembly which serves to locate and bond the external skin to the internal components of the airfoil. The bonding assembly includes cooperating mold parts including a steel base member having an internal cavity that conforms to the desired configuration of the upper or lower surface of the airfoil; and a caul plate member which forms the upper closure of the bonding cavity. The caul plate member can take the form of a steel or aluminum cover for the bonding cavity during the bonding operation.

The use of rigid upper and lower components of the mold is acceptable in most cases; however, when an air foil having complex and pronounced surface contour changes is being formed, the rigid caul plates may not be useful since such airfoils must be formed at higher pressures so as to ensure that the skin follows the machined contours of the core without leaving voids between the airfoil skin and the airfoil core. We have experimented with a compound caul for high pressure molding of airfoils, which compound caul included a central flexible component and peripheral rigid elements. The flexible component was formed from silicone rubber, and the peripheral rigid elements were formed from aluminum spars or beams. We found that the rigid aluminum caul elements resulted in the formation of undesirable peripheral areas in the molded airfoil which contained voids wherein the skin was not bonded to the core. We believe that these voids are the result of the inability of the rigid caul elements to adapt to areas of the core wherein pronounced surface contour changes occur.

We have also experimented with a caul which was made solely from the silicone rubber material. When such a flexible caul was used, there were no voids between the skin and core, but the edges of the core were undesirably deformed, i.e., crushed, by the molding pressure, and the inability of the flexible material to protect the edges of the core against crushing. What is needed is a caul component which can conform to the contours of the core, while at the same time protecting the edges of the core against crushing. We have discovered that a wire mesh which is commonly used as a conveyer belt has the necessary properties to be used as an airfoil caul component in combination with a wholly flexible component of silicone rubber, or some similar elastomer.

DISCLOSURE OF THE INVENTION

This invention relates to a compound caul assembly for use in pressure bonding the skin of an airfoil to the airfoil core, and to a mold assemblage including such a compound caul assembly. The compound caul assembly includes a central elastomeric component which is preferably formed from silicone rubber, and also includes peripheral components which are formed from mesh belts which are flexible in one direction, and are rigid in a transverse direction. We have chosen to categorize such mesh belt caul components as "semi-rigid" for purposes of linguistic economy.

The structure of such belts will be more clearly set forth hereinafter.

The skin-to-core bonding assemblage includes a basal contoured support plate, which is preferably formed from steel, and the composite caul plate assembly. The support plate is pre-machined so as to provide a negative mold of one of the contoured surfaces of the airfoil. The composite skin is placed on the support plate, and a pre-machined contoured core is placed on the skin. The surface of the core facing away from the skin is then covered with an elastomeric covering which will evenly transmit the bonding pressure exerted on the assembly in a pressurized autoclave. The edges of the assembly are covered with the semi-rigid elongated caul plates which are flexible in the direction of elongation, but rigid in the transverse direction. The caul plates are preferably formed from a wire mesh. The elongated-direction flexibility of the caul plates allows them to closely follow the changes in the surface contours of the core, and the transverse rigidity of the caul plates enables them to protect the edges of the core from crushing during the bonding process. All peripheral edges of the core are overlain by the semi-rigid caul plates, and the caul plates are then overlain by silicone rubber. When the aforesaid bonding assembly is employed, the result is a void-free bond between the core and skin, with the edges of the core being free of any crushing.

It is therefore an object of this invention to provide an improved bonding assembly for evenly bonding a composite material skin to a contoured surface of a honeycomb core in an airfoil assembly.

It is a further object of this invention to provide an improved bonding assembly of the character described which produces a complete bond between the skin and the core that is free of skin-core voids.

It is yet another object of this invention to provide an improved bonding assembly of the character described including a compound bonding assembly caul that includes a medial elastomeric member and peripheral semi-rigid elongated members.

It is an additional object of this invention to provide an improved bonding assembly of the character described wherein the peripheral semi-rigid caul members are flexible in their elongated direction, and are rigid in a direction which is transverse to their elongated direction.

It is yet another object of this invention to provide an improved bonding assembly of the character described wherein the peripheral caul members are operative to closely conform to core contours in the elongated direction and are operative to protect edges of the core from crushing during the bonding operation.

BRIEF DESCRIPTION OF THE DRAWINGS

These and other objects and advantages of the invention will become more readily apparent from the following detailed description of several embodiments of the invention when taken in conjunction with the accompanying drawings in which.

DETAILED DESCRIPTION OF SPECIFIC EMBODIMENTS OF THE INVENTION

Figure 1:
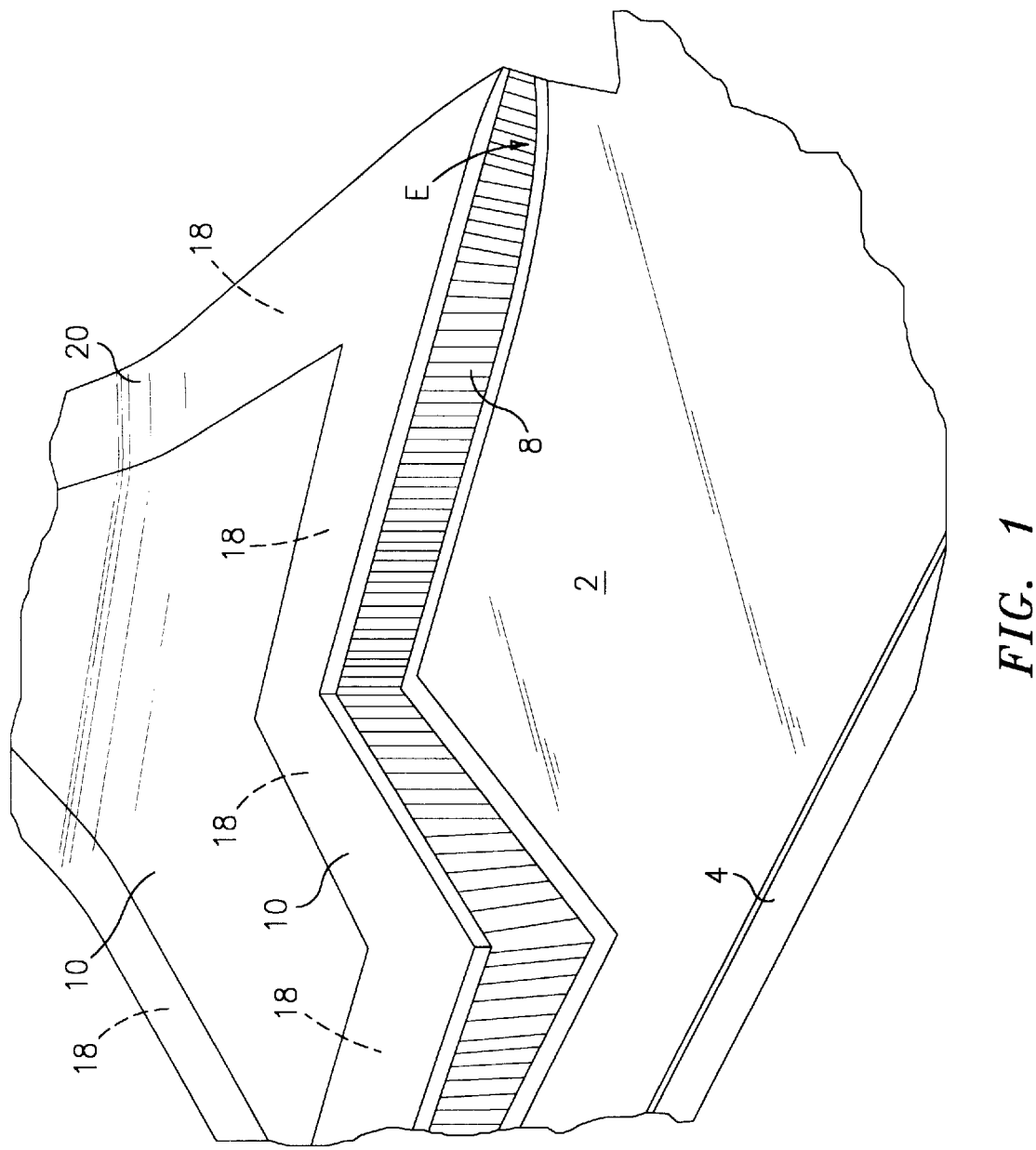
FIG. 1 is a fragmented perspective view of one corner of the bonding assembly showing certain contours of the airfoil core and how they are followed by the compound caul assembly.

Referring now to the drawings, there is shown in FIG. 1 a perspective view of the bonding layup as it appears looking from the basal portion of an airfoil tip assembly. The airfoil skin 2 and steel support plate 4 are shown as well as the airfoil core 8. An elastomeric caul component 10, which may be formed from silicone rubber, neoprene, viton, fluoroelastomers, or other high temperature elastomers, covers the entire upper surface of the layup, and the semi-rigid caul components 18 cover the entire periphery of the upper surface of the layup. It will be appreciated that the upper surface of the layup, as seen in FIG. 1 is the surface of the layup to which the bonding pressure will be applied. It will be noted that edges E of the core 8 taper down in the transverse direction of the semi-rigid components 18, and that one of the declivity areas 20 is shown in FIG. 1. FIG. 1 illustrates the relatively complex contours of a rotor blade tip which is a particular type of airfoil that can be successfully fabricated using the assembly of this invention.

Figure 3:
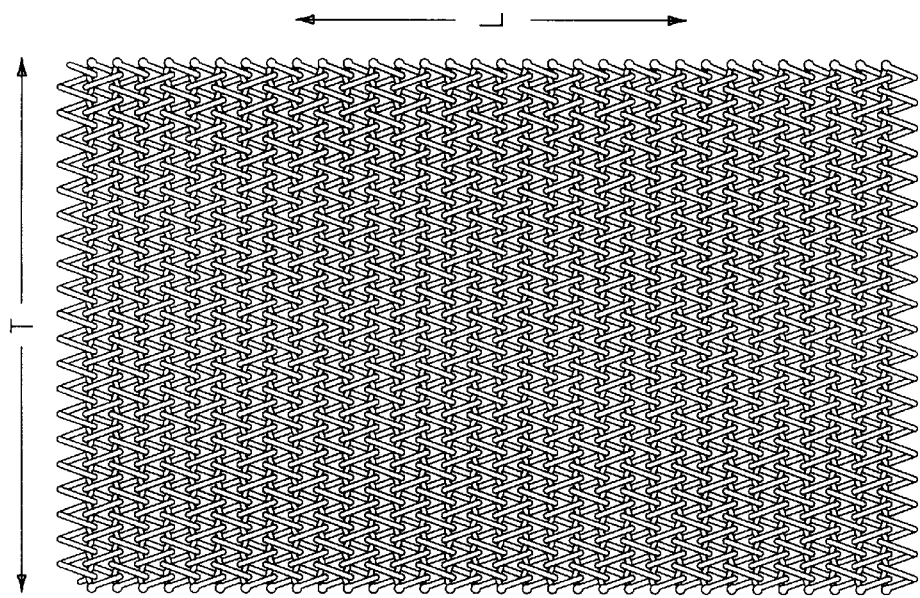
FIG. 3 is a plan view of a portion of the semi-rigid component of the compound caul.
Figure 2:
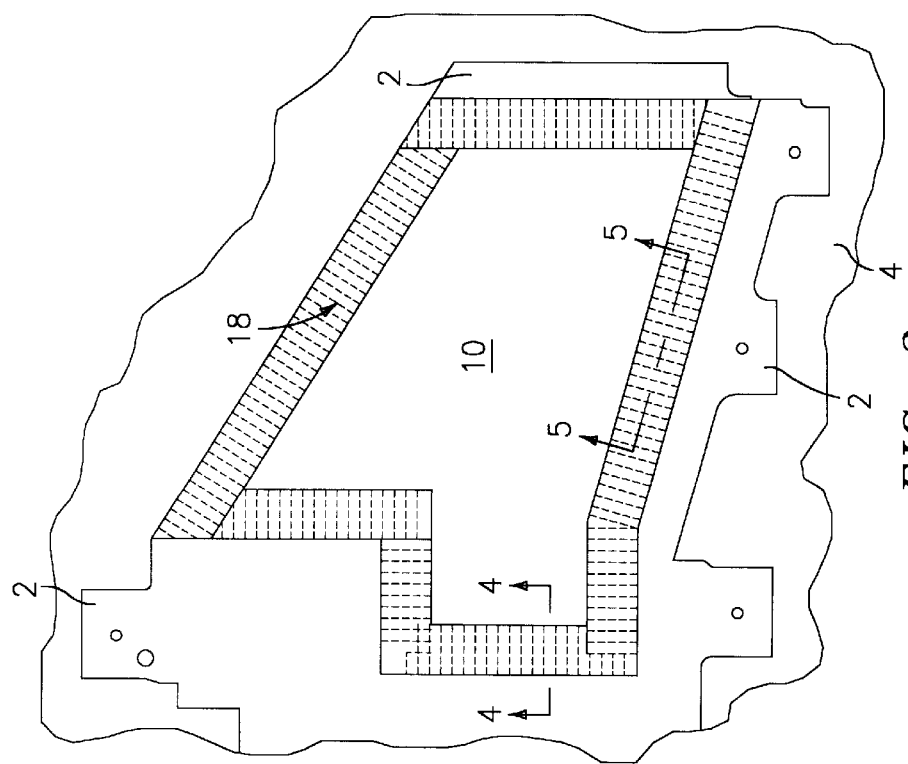
FIG. 2 is a plan view of the bonding assembly shown in FIG. 1.

FIG. 2 is a plan view of the airfoil tip-bonding assembly of FIG. 1. It will be noted that the entire periphery of the elastomeric component 10 of the compound caul is covered by the semi-rigid caul component 18. FIG. 3 is a plan view of the semi-rigid caul component 18 which is a woven steel mesh material. The semi-rigid caul material 18 is rigid in the transverse direction T, and is flexible in the longitudinal direction L. This mesh can be obtained from Cambridge International Co. of Church Creek, Md.

Figure 4:
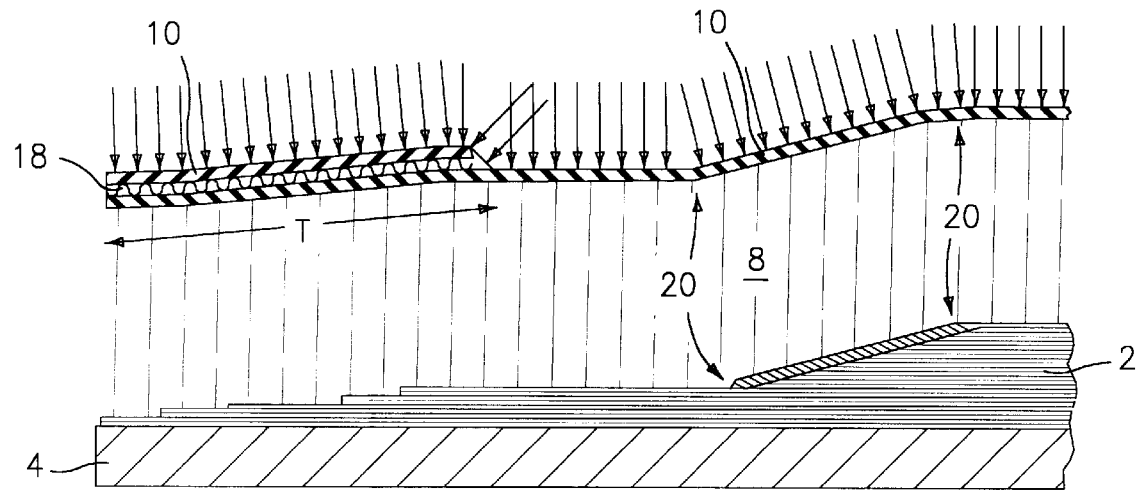
FIG. 4 is a sectional view of the bonding assembly of this invention taken along line 4—4 of FIG. 2.
Figure 5:
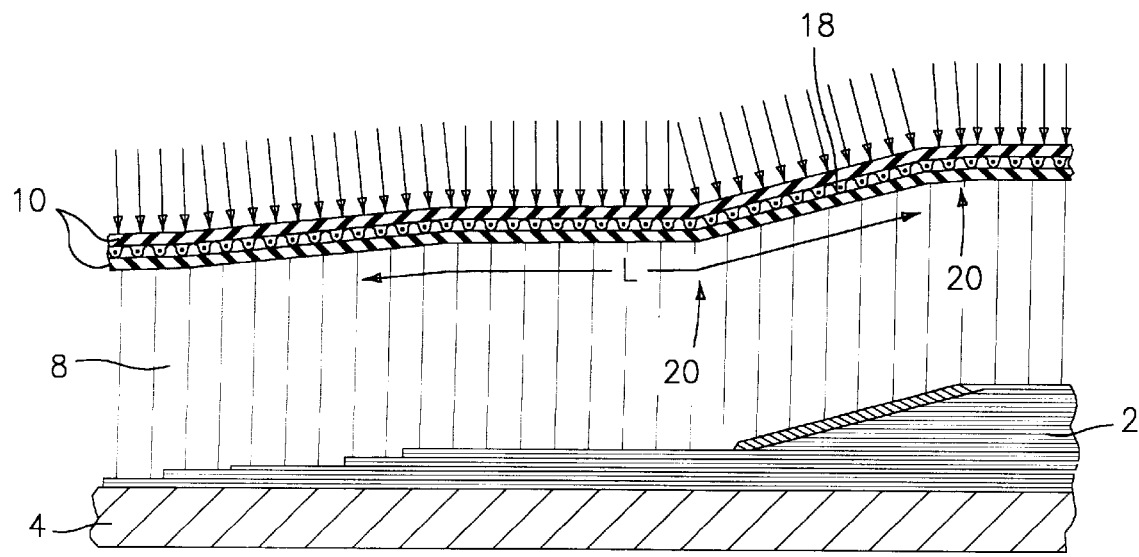
FIG. 5 is a sectional view of the bonding assembly of this invention taken along line 5—5 of FIG. 2.

Referring now to FIGS. 4 and 5, fragmented cross-sectional views of the airfoil bonding assembly are shown. FIG. 4 illustrates how the skin 2 is placed on the support plate 4 and the core 8 is placed on the skin 2. The skin 2 is made up of a varying number of plies of unidirectional graphite/epoxy composite sheets. The thickness of the skin 2 in the embodiment shown in FIGS. 4 and 5 varies from 0.05 inch to 0.25 inch, and the skin thickness variations occur in a non-linear manner, as can be seen in FIGS. 4 and 5. It will be appreciated that a suitable adhesive such as "METLBOND", which is an adhesive product of Cytec Industries, is applied to the skin 2 or to the core 8, preferable to the skin 2, so as to enable bonding of the skin 2 to the core 8. The contour of the varying thickness composite skin 2 generally follows the contours of the pre-machined core 8, and there are a plurality of zones 20 on the skin 2 and the core 8 wherein abrupt changes in the contour of the two components occur. It is in the zones 20 that voids can occur during the bonding process when a rigid peripheral caul component is used. The reason for the formation of voids in the bond is the inability of a rigid caul component to press the high density core 8 tightly down against the skin 2 in the zones 20 due to the homogeneous mechanical properties of a rigid caul plate. In fabricating an airfoil with the bonding assembly of this invention, the flexible elastomeric caul component 10 is placed on the upper surface of the skin 2 and core 8 layup, and the semi-rigid caul components 18 are positioned along the edges of the core 8, as shown in the drawings. It will be noted from FIG. 4 that the component 18 forms a rigid and rectilinear covering over the peripheral portions of the elastomeric component 10 and also over the underlying portions of the core 8 in the transverse direction T of the components 18, thereby protecting the core 8 from marginal crushing or collapse during the bonding process. Likewise, it will be noted from FIG. 5 that the component forms a flexible covering over peripheral portions of the elastomeric component 10 and the underlying portions of the core 8 in the longitudinal direction L of the components 18, thereby enabling transfer of bonding pressure to the abrupt contour transition zones 20 which underlie the caul components 18. The caul components 18 are overlain by the elastomeric component 10. The bonding pressure exerted on the assembly in the laid up assembly in a bonding autoclave varies during the bonding process, and reaches maximum pressures of about 65 psig, which is about three times the pressure used to bond less complex forms of airfoil skins and cores, and the temperature of the autoclave is about 250° F. The autoclave pressure is exerted on all parts of the caul components 10 and 18 at right angles to the planar surfaces of the components 10 and 18.

It will be appreciated that the semi-rigid hybrid caul plate prevents "core crushing" by dissipating the pressure and conforming to the transitions in the composite skin inner mold line contour. The semi-rigid hybrid caul plate consists of a high temperature silicone bladder with high strength steel reinforcements around the perimeter of the bladder. The steel reinforcements are strands of wire formed to a sine wave. Each strand is interwoven to form a chain. The strands are perpendicular to the perimeter of the core, eliminating core rounding or crushing. The added stiffness prevents the high autoclave pressure from crushing the core cells at the perimeter by transferring the autoclave load from the perimeter towards the center of the core. The steel strands act like a cantilever beam. Since the steel strand arrangement allows the strands to follow closely the contours of the core perimeter, constant bonding pressure is maintained. The interwoven feature of the sinusoidal steel wire allows for the caul plate to be flexible, providing downward load to the bond line between the core and the skin. Utilizing the high temperature and durability of silicone or some other high temperature elastomer coupled with the high strength steel and flexible interwoven construction, the semi-rigid hybrid caul plate construction eliminates core crushing (buckling) while allowing evenly distributed pressure transfer to the concave and convex contours of the core.

Since many changes and variations of the disclosed embodiment of this invention may be made without departing from the inventive concept, it is not intended to limit the invention otherwise than as required by the appended claims.

What is claimed is:

1. A method for bonding an airfoil skin to an airfoil core, said method comprising the steps of:

a) providing a varying thickness skin part for an airfoil;

b) placing said skin part on a support plate;

c) providing a core part for an airfoil;

d) placing said core part on said skin part;

e) covering said core part with an elastomeric caul component;

f) covering peripheral margins of said elastomeric caul component with elongated semi-rigid caul components which are flexible in their direction of elongation, and are rigid in their direction which is transverse to their direction of elongation;

g) covering said semi-rigid caul components with strips of said elastomeric caul component;

h) subjecting said caul components to heat and pressure sufficient to bond said skin to said core.

2. The method of claim 1 wherein said core part has pronounced surface contour changes.

3. The method of claim 1 wherein said caul components are subjected to temperatures of up to about 250° F. and pressures of up to about 65 psig during said bonding step.

4. An assemblage for bonding an airfoil skin to an airfoil core, said assemblage including a hybrid caul plate assembly, said hybrid caul plate assembly comprising a central elastomeric component and peripheral semi-rigid metal components, said semi-rigid components being flexible in one direction and rigid in a direction which is transverse to said one direction.

5. The assemblage of claim 4 wherein said semi-rigid components are axially elongated so as to be operable to overlie side edges of the airfoil core, and are flexible in the axially elongated direction so as to be operable to closely conform to areas of pronounced contour changes extant in the airfoil core, and are operable to transmit bonding pressure evenly to said areas of pronounced contour changes, whereby the airfoil skin will bond to the airfoil core without any bond bridging or bond voids occurring along edges of the airfoil overlain by said semi-rigid components.

6. The assemblage of claim 5 wherein said semi-rigid components are rigid in a transverse direction so as to be operable to protect edges of the core from being crushed or deformed during application of bonding pressure to the assemblage.

7. The assemblage of claim 6 wherein said semi-rigid components are sandwiched between elements of said elastomeric component.

8. A hybrid caul plate assembly which is operable to transmit an evenly distributed pressure to an airfoil core and airfoil skin during bonding of the skin to the core, said hybrid caul plate assembly comprising:

a) a central elastomeric component which is operable to closely conform to contour changes in the airfoil core and to transmit bonding pressure evenly to the airfoil core; and b) elongated peripheral semi-rigid components which are flexible in an elongated direction and rigid in a direction transverse to said elongated direction, said peripheral semi-rigid components being operable to closely conform to the contour changes in the airfoil core in said elongated direction, and are operable to prevent peripheral portions of the airfoil core from crushing when said peripheral semi-rigid components are subjected to bonding pressure.

9. The hybrid caul plate assembly of claim 8 wherein said peripheral semi-rigid components are formed from a mesh of interwoven sinusoidal strands of steel.

10. The hybrid caul plate assembly of claim 8 wherein said central component is formed from a high temperature elastomeric material.

11. The hybrid caul plate assembly of claim 8 wherein said peripheral semi-rigid components are sandwiched between layers of said central elastomeric component.

* * * * *